United States Patent [19]

Heinrich et al.

[11] 4,390,569

[45] Jun. 28, 1983

[54] PROCESS FOR FORMING A POLYMERIC COATING ON THE OUTSIDE SURFACE OF A LENGTH OF TUBING

[75] Inventors: Wolfgang Heinrich, Salach; Klaus-Dieter Hammer, Mainz-Mombach; Max Bytzek, Wiesbaden, all of Fed. Rep. of Germany

[73] Assignee: Hoechst Aktiengesellschaft, Frankfurt am Main, Fed. Rep. of Germany

[21] Appl. No.: 247,944

[22] Filed: Mar. 26, 1981

[30] Foreign Application Priority Data

Mar. 28, 1980 [DE] Fed. Rep. of Germany ....... 3012064

[51] Int. Cl.³ .......................... B05D 3/12; B05D 1/40
[52] U.S. Cl. .................... 427/366; 427/375; 427/394; 427/439; 427/374.1; 426/135; 426/138; 118/115; 118/117; 118/18; 118/20; 118/419
[58] Field of Search ................. 118/348, 365, 439, 18, 118/20, 44, 56, 67, 408, 26, 30, 63, 419, 115, 117; 427/177, 375, 394, 398.1, 366, 348, 374.1, 365, 439, 230; 426/135, 138; 138/118.1

[56] References Cited

U.S. PATENT DOCUMENTS

| | | |
|---|---|---|
| 2,210,436 | 10/1937 | Weigand et al. |
| 2,901,358 | 2/1958 | Underwood et al. |
| 2,961,323 | 11/1960 | Underwood et al. |
| 2,977,243 | 3/1961 | Meier .................. 118/117 |
| 3,378,379 | 4/1968 | Shiner et al. |
| 3,413,169 | 11/1968 | Krings et al. |
| 3,424,126 | 1/1969 | Mahoney .............. 118/63 |
| 4,233,341 | 11/1980 | Hammer et al. |
| 4,283,426 | 8/1981 | Schenk ................ 426/105 |

FOREIGN PATENT DOCUMENTS

| | | |
|---|---|---|
| 1081033 | 7/1980 | Canada. |
| 8646 | 7/1979 | European Pat. Off. |
| 1142297 | 7/1963 | Fed. Rep. of Germany. |
| 1900324 | 5/1971 | Fed. Rep. of Germany. |
| 1938748 | 1/1972 | Fed. Rep. of Germany. |
| 2142685 | 7/1972 | Fed. Rep. of Germany. |
| 2540996 | 1/1977 | Fed. Rep. of Germany. |
| 2512994 | 3/1979 | Fed. Rep. of Germany. |
| 2512995 | 4/1979 | Fed. Rep. of Germany. |
| 984026 | 2/1965 | United Kingdom. |
| 1017484 | 1/1966 | United Kingdom. |

Primary Examiner—Shrive P. Beck
Attorney, Agent, or Firm—Schwartz, Jeffery, Schwaab, Mack, Blumenthal & Koch

[57] ABSTRACT

Disclosed is a process for coating the outside surface of a length of tubing comprising the steps of coating the outside surface of the tubing with an initial layer of coating liquid, transporting the coated tubing along its longitudinal axis in a substantially vertically upward direction; passing the coated tubing through a constriction of predetermined width to reduce the thickness of the initial layer and form a thin layer of desired thickness on the outside of the tubing; leveling the thin layer without reducing the weight per unit area of the thin layer to form a layer of uniform thickness; and exposing the tubing to heat of a sufficient temperature to solidify the coating liquid and form an uninterrupted film of uniform thickness on the outside of the tubing.

8 Claims, 1 Drawing Figure

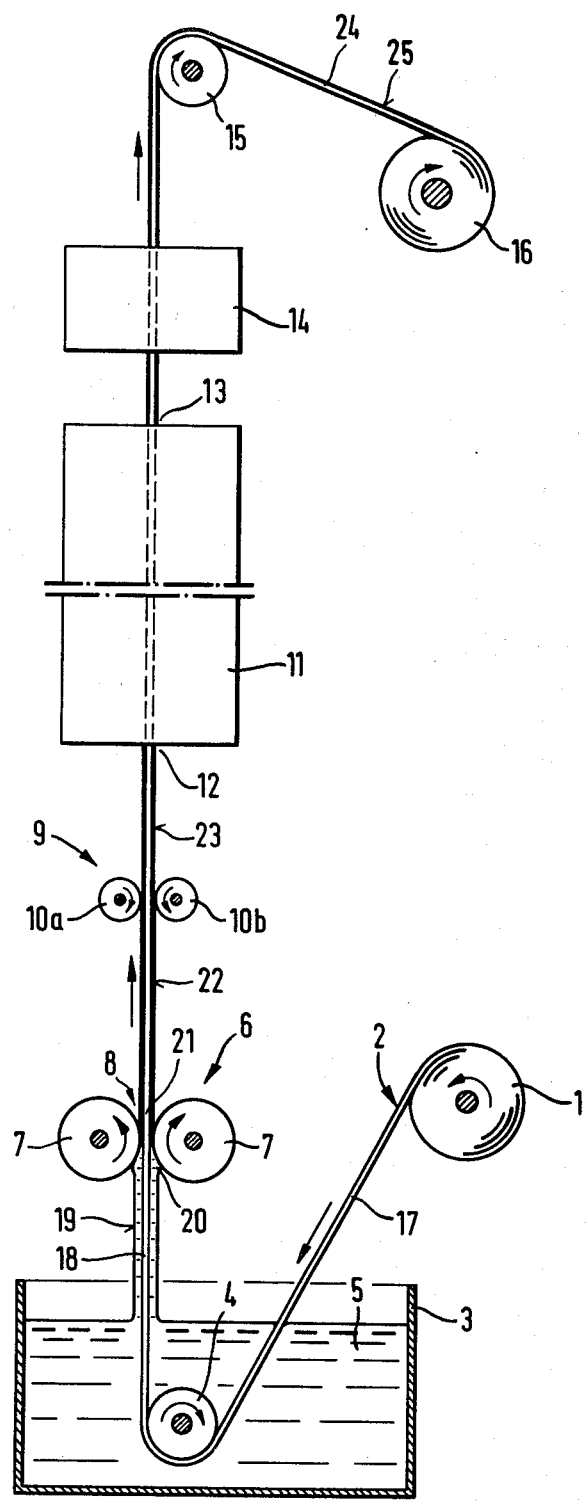

PROCESS FOR FORMING A POLYMERIC COATING ON THE OUTSIDE SURFACE OF A LENGTH OF TUBING

BACKGROUND OF THE INVENTION

The present invention relates to a process for forming a polymeric coating on the outside surface of a length of tubing and more particularly to tubing used as a packaging sheath for foodstuff such as cellulose hydrate tubing.

A process of the type concerned here is disclosed in German Auslegeschrift No. 2,124,685. However, in this known process, the outside surface of a length of plastic tubing is coated with an aqueous polymeric dispersion and because the tubing does not readily absorb water, the problem of marked water absorption and swelling, and of shrinkage on drying, such as arises with cellulose hydrate tubing, does not apply. In this prior publication, the plastic tubing is passed over rolls which approximately even out the thickness of the coating but cannot ensure precise metering. Further, the process disclosed in German Auslegeschrift No. 2,124,685 requires that the tubing be heated and cooled in the inflated state, which is relatively expensive.

German Pat. No. 1,142,297 discloses a process for coating the outside of cellulose hydrate tubing, wherein the outside of the tubing is exposed to an aqueous polymeric dispersion by passing the tubing through the dispersion. The tubing, coated with the aqueous dispersion, is then inflated with support air to the desired diameter, and is dried in this state. In the known processes there is the possibility of flaws forming in the coating due to the non-uniform run-off of the liquid coating layer resulting from the inflation of the tubing. The formation of coating layers having a uniform thickness over the entire outer circumferential surface of the tubing is frequently impossible, or only possible with great difficulty, when inflation of the tubing is required because virtually unavoidable pressure differences in the tubing cavity lead to non-uniform run-off of the relatively low-viscosity polymeric dispersion on the outside of the tubing, and hence, results in the formation of non-uniform coating. Moreover, the inflation of the tubing is necessary in the known processes to counteract the decrease in width of the tubing as a result of the tubing swelling due to the absorption of dispersing medium from the aqueous dispersion.

A further disadvantage of the known processes for externally coating cellulose hydrate tubing with an aqueous polymer dispersion of a customary concentration results from the use of aqueous coating dispersions having a relatively high water content because the cellulose hydrate tubing becomes heavily moistened with water, and tends to undergo an undesired change in dimension due to shrinkage, especially upon drying. Further, because the known processes employ an aqueous polymeric dispersion with a relatively low content of dispersed polymer, the amount of water which has to be expelled by the action of heat in order to form a solid film coating on the outside of the tubing is relatively large and requires a substantial expenditure of energy.

Furthermore, since the known processes require inflation of the tubing in order to counteract shrinkage, especially during the drying step, virtually unavoidable fluctuation of internal pressure in the tubing leads to the formation of uneven film coatings, resulting from the free run-off of the coating layer applied to the outside of the tubing.

SUMMARY OF THE INVENTION

Accordingly, it is the object of the present invention to provide a process for forming an even, uninterrupted, uniformly thick film coating of a polymer on the outside of cellulose hydrate tubing, using an aqueous polymeric dispersion as the coating liquid.

A further object of the present invention is to provide a process which can be carried out without substantial shrinkage of the tubing, so that inflation of the tubing is unnecessary.

It is another object of the invention to provide a process utilizing a polymeric dispersion with a relatively high content of dispersed synthetic resin component, so that the coating of the outside of the tubing with the liquid, aqueous polymeric dispersion is carried out virtually without run-off, resulting in the formation of a uniform coating.

In order to accomplish the foregoing objects in accordance with the present invention, there is provided a process for coating the outside surface of a length of tubing comprising the steps of coating the outside surface of the tubing with an initial layer of coating liquid; transporting the coated tubing along its longitudinal axis in a substantially vertically upward direction; passing the coated tubing through a constriction of predetermined width to reduce the thickness of the initial layer and form a thin layer of desired thickness on the outside of the tubing; leveling the thin layer without reducing the weight per unit area of the thin layer to form a layer of uniform thickness; and exposing the tubing to heat of a sufficient temperature to solidify the coating liquid and form an uninterrupted film of uniform thickness on the outside of the tubing.

In accordance with one embodiment of the present invention, the coating liquid comprises an aqueous polymeric dispersion having a content of dispersed polymer of at least about 20% by weight, preferably between 20 and 40% by weight, relative to the total weight of the dispersion.

In accordance with a preferred aspect of the present invention, the step of constricting the tubing comprises passing the tubing through a constriction of sufficient width to insure that the thin layer of coating liquid has a thickness corresponding to a weight per unit area in the range of about 6 to 20 g of polymer per $m^2$ of tubing surface.

Further objects, features and advantages of the invention will become apparent as the following description proceeds, with particular reference to the application drawing.

BRIEF DESCRIPTION OF THE DRAWING

The FIGURE schematically illustrates the implementation of the process in accordance with the present invention.

DETAILED DESCRIPTION OF PREFERRED EMBODIMENTS

In carrying out the process, the tubing is transported at constant speed in its lengthwise axial direction and for brevity, the movement of the tubing will be referred to hereinafter simply as "transportation." The transportation of the tubing can be effected, for example, by continuously winding the tubing (e.g., as the last step in carrying out the process) onto a rotatably constructed, drivable and actually driven stock reel so that the tubing is transported at a speed of, advantageously, between 30 and 60 m/min.

The process employs a coating liquid comprising an aqueous polymeric dispersion having a high proportion of dispersed polymer compared to the amount of the dispersing medium. The dispersed polymer can be synthetic, or, according to the present invention, naturally occurring. A high proportion of dispersed component, relative to the total weight of the aqueous dispersion, is considered to be a dispersion which contains at least 20% by weight of dispersed polymer. Particularly advantageous aqueous polymeric dispersions are those which contain an amount of dispersed polymer in the range from about 20 to 40% by weight, or preferably in the range of about 30 to 40% by weight, relative to the total weight of the dispersion.

Aqueous polymeric dispersions suitable for carrying out the process are those which form virtually water-or water-vapor impermeable films, after expulsion of the dispersing medium and after fusion by exposure to heat at an adequately high temperature, to form a solid film. Preferred aqueous polymeric dispersions contain, as the dispersed polymer component, copolymers having a preponderant proportion of copolymerized vinylidene chloride. Advantageously, the copolymers contain at least 75% by weight of copolymerized vinylidene chloride. Particularly suitable aqueous polymeric dispersions are those which contain, as the dispersed polymer component, copolymers such as those described in German Auslegeschrift No. 2,512,995 and German Pat. No. 2,512,994, the disclosures of which are hereby incorporated by reference.

The cellulose hydrate tubing used to carry out the invention advantageously has a swelling value (water-retention capacity) in the range from about 120 to 140% (DIN 53814) and is preferably fiber-reinforced. By a fiber-reinforced cellulose hydrate tubing it is understood that the tubing contains a fiber web embedded in its wall which does not hamper the diffusion of water through the wall. The wall of the cellulose hydrate tubing advantageously has a water content in the range from about 8 to 12% by weight, relative to the total weight of the tubing, and a content in the range of from about 18 to 24% by weight, advantageously of 22% by weight, of a chemical agent capable of plasticizing cellulose hydrate, for example, glycerol, glycol or polyglycol. The percentage by weight data in each case relate to the total weight of the fiber-reinforced cellulose hydrate tubing.

The tubing includes, at least on the outside thereof and preferably both on the outside and on the inside thereof, an adhesion-promoting layer of a chemical agent which is permeable to water and water vapor. This layer can, for example, have a thickness corresponding to between about 30–120 mg/m². For example, the layer can comprise a water-insoluble reaction product of epichlorhydrin and a polyamine-polyamide, formed by heat curing. The adhesion-promoting layer insures that the plastic film coating is firmly bonded to the tubing surface. The tubing has a diameter of 90 mm and a layflat width of 143 mm. A tubing having an adhesion-promoting layer on the outside is hereafter referred to as the initial tubing (process starting material).

The process is carried out in such a way that the plastic film coating on the outside of the end product of the process (the process product) advantageously has a thickness corresponding to a weight per unit area in the range of advantageously 6 to 20 g of polymer per m² of tubing surface, preferably 8 to 12 g of polymer per m² of tubing surface. The film coating structure is free from interruption and possesses uniform thickness.

With particular reference to the drawing, the process according to the invention is best understood by the following example wherein the tubing 2 used is constructed from cellulose hydrate having a swelling value of, for example, 130%, a water content of 10% by weight, and a content of glycerol, present as a plasticizer, of 22% by weight. The percentage by weight data is relative to the total weight of the tubing. The tubing 2 is fiber-reinforced and includes, on its outside a water-permeable and water vapor-permeable thin layer, corresponding to 30 to 120 mg/m², of an adhesion-promoting chemical substance, such as a water-insoluble reaction product of epichlorhydrin and a polyamine-polyamide. The width of tubing 2 is 90 mm, with a layflat width of 143 mm.

A length of tubing approximately 350 m long is wound in layflat form on a rotatably constructed stock reel mounted in a fixed position. The tubing 2 is continuously unwound from the stock reel 1 in a layflat state at a constant speed of 40 m/min. in its lengthwise axial direction. A tubing loop is formed by transporting the tubing first in a downward direction into a trough 3 filled with aqueous polymeric dispersion 5, around a guide roller 4 and then vertically upward out of the liquid. The guide roll 4 is fixed to the trough 3 so that the lengthwise axis of the roll 4 runs substantially horizontally. The spacing between the bottom of the trough 3 and the circumferential surface of the roll 4 is at least twice the thickness of the tubing wall. The tubing 2 is passed, in layflat form, over the circumference of the guide roll 4 in such a way as to rest partly against this circumference.

The aqueous polymeric dispersion 5 contained as the coating liquid in the trough 3 contains 25% by weight of dispersed polymer, for example, a copolymer comprising 88% by weight of copolymerized vinylidene chloride, 3% by weight of copolymerized acrylic acid, 4% by weight of copolymerized acrylonitrile and 5% by weight of copolymerized methyl acrylate. The percentage by weight data in each case being relative to the total weight of the copolymer. A dispersion of the stated concentration can be prepared, for example, by starting from a dispersion which, for instance, contains 55% by weight of the stated copolymer in dispersed form, and bringing this dispersion, by dilution with water, to the appropriate concentration for carrying out the process.

An initial layer 19 of aqueous polymeric dispersion is deposited on the outside of the tubing 2 issuing vertically upward from the coating liquid. Above the surface of the coating liquid in the trough 3, the thickness of the initial layer 19 is reduced, but it is advantageous to first pass the tubing 2 carrying the initial layer 19 on its outside, through an air zone and then to reduce the thickness of the layer. The initial layer 19 is reduced by partially holding back the aqueous polymeric dispersion to form a thin liquid layer 22 whose thickness is less than the thickness of the initial layer 19. After leveling and subsequent expulsion of the aqueous dispersion medium and fusion of the dispersed component by exposure to heat at a sufficiently high temperature, a plastic film coating 25 whose thickness corresponds to a weight per unit area in the range of, advantageously, 6 to 20 g of polymer per m² of tubing surface is formed on the outside of the tubing 2.

The reduction of the thickness of the initial layer 19 is effected by passing the layflat tubing 2, carrying the initial layer 19 on its outside, vertically upward and continuously through the metering constriction of a horizontal pair of rolls 7. The metering constriction width corresponds to twice the thickness of the tubing wall plus twice the thickness of a liquid layer of aqueous polymeric dispersion which, after leveling and expulsion of the dispersing medium from the layer and fusion of the dispersed component by exposure to heat at a sufficiently high temperature, produces, on the outside of the tubing, a polymeric film coating 25 of uniform thickness, corresponding to a weight per unit area in the range of, advantageously, 6 to 20 g of copolymer per m² of tubing surface.

The pair of rolls 7 are positioned so that a common plane can pass through the horizontally extending axes of the parallel-spaced rolls 7. The circumferential surfaces of the rolls 7 directly face one another and delimit the horizontal metering constriction through which the tubing 2, having a wall thickness in the range of 80 to 120 µm is passed. The metering constriction of the horizontal pair of rolls 7 advantageously has a width in the range of 200 to 400 µm, preferably in the range of 200 to 300 µm.

The rolls 7 are mounted as a unit in a fixed position with the constriction being located above the trough 3 so that the layflat tubing 2 runs substantially vertically in the region between the guide roll 4 and the constriction of the pair of metering rolls 7.

Because of the relatively low water content of the aqueous polymeric dispersion 5, free run-off of the precisely metered thin layer 22 does not occur, to provide a film coating 25 on the outside of the tubing 2 having a uniform thickness.

The pair of metering rolls 7 are mounted in a fixed position by means of a frame to which the rolls 7 are fixed. Each roll of the pair of rolls 7 is rotatable and drivable, for example, by motors in a direction of rotation corresponding to the direction of transportation of the tubing 2.

With a speed of transportation of the tubing 2 of 40 m/min, a concentration of the aqueous polymeric dispersion of 25% by weight, a tubing wall thickness of 100 µm, and a constriction width of 240 µm, the thin layer 22 of aqueous polymer dispersion on the outside of the tubing 2 has a thickness of 20 µm and after expulsion of the dispersing medium therefrom provides a polymer film coating 25 having a thickness of 8 to 10 µm.

The relative balance of the stated process parameters can be determined, for each case, in a simple manner by a few simple preliminary experiments. Where required, the width of the constriction and/or the speed of transportation of the tubing can be varied without interrupting the process.

After the layflat tubing 2 has left the constriction of the horizontal pair of metering rolls 7, it possesses, on its outer surface, a thin liquid layer 22 of aqueous polymer dispersion which is then leveled. The leveling of the thin layer 22 is effected by allowing a force to act continuously on the parts of the layer 22 which are present on the outer faces of the planar wall surfaces of the layflat tubing which is being transported vertically upwardly which evens out the thin layer 22 without reducing its weight per unit area. After expulsion of the dispersing medium from the thin layer and fusion of the dispersed component by exposure to sufficient heat, a film coating of uniform thickness is obtained on the outside of the tubing.

The leveling of the liquid layer 22 can be effected, for example, by exposing the outwardly pointing surfaces of the thin liquid layer 22 on the planar outer faces of the layflat vertical tubing continuously to the force of a stream of air issuing from a straight narrow slit in a nozzle element at a flow rate such that it produces the required leveling of the liquid layer. The longitudinal axes of the straight slits of the nozzle elements of the air knife each run at a right angle to the lengthwise axis of the tubing 2, advantageously in such a manner that a common plane can pass through the longitudinal axes of the slits of the nozzle bodies. The nozzle elements which form the air knife are each mounted in a fixed position.

Another way of achieving the stated leveling is shown in the drawing and comprises bringing the outwardly pointing surfaces of those parts of the thin layer 22 which are present on the planar faces of the layflat tubing continuously into contact, along straight narrow zones, with a part of the circumferential surface of one leveling roll of a pair of leveling rolls 10a, 10b under conditions which prevent reducing the weight per unit area of this layer and even-out the layer 22. The contact zones between the parts of the circumferential surfaces of the leveling rolls 10a, 10b and the outwardly pointing surfaces of the liquid layer 22 are narrow relative to the width of the layflat tubing 2. The straight contact zones each run at a right angle to the lengthwise axis of the tubing.

Viewed in the direction of transportation of the tubing, the pair of leveling rolls 10a, 10b is located above, or after, the pair of metering rolls. The individual leveling rolls of the pair of leveling rolls 10a, 10b are arranged parallel to one another; mutually facing parts of the circumferential surfaces of the rolls of this pair define a constriction space, whose width is such that the parts of the liquid layer 22 which are present on the outer faces of the flat plane of the layflat tubing 2 are each in contact with a part of the circumferential surface of one of the rolls of the pair of leveling rolls 10a, 10b. Each roll 10a, 10b, is preferably of the same diameter and comprises a material which gives them dimensional stability, preferably steel having a smooth surface.

Each of the pair of leveling rolls 10a, 10b is mounted in a fixed position and is constructed to be rotatably drivable about its axis for example by means of a motor. The direction of rotation of the leveling rolls 10a, 10b is advantageously in each case counter to the direction of transportation of the tubing 2.

Alternatively, the leveling of the thin, liquid layer 22 can also be effected by plate-like doctor elements of fixed shape.

Before exposure to heat, the tubing 2 is advantageously passed through an air zone of a certain length; for example, the length of this zone is 40 to 60 cm, and the surrounding air is at room temperature.

Devices are provided for mounting, in a fixed position, the pair of metering rolls, the pair of leveling rolls, the nozzle elements which form the air knife, the cooling roll and the stock reels.

The tubing, having a leveled thin layer 23 of aqueous polymeric dispersion on its outside, is then exposed to the action of heat, at a sufficiently high temperature to expel the dispersing medium from the liquid layer and fuse the dispersed component to give an uninterrupted polymer film, this being achieved, for example, by passing the tubing 2 continuously through a drying tunnel 11. The drying tunnel can be equipped with heat-emitting infrared heating elements. At the entry 12 of the drying tunnel 11, the tubing 2 is heated to a temperature of about 80° C., while at the end 13 of the drying tunnel 11 the tubing is heated to a temperature of 140° C. The dryer is advantageously sub-divided into a plurality of drying zones which can be regulated separately from one another.

After leaving the dryer, the tubing 2 is advantageously cooled, for example, by bringing it into contact with the water-cooled circumferential surface of a rotatably constructed roll. The tubing 2 is cooled in order to prevent the individual layers of the reel from sticking to one another after the tubing has been rolled up.

If appropriate, the tubing 2, after drying and cooling, is moistened with water, for example, in such a way that the carrier tubing 2 of cellulose hydrate has a water content in the range from about 8 to 12% by weight, preferably a water content of 10% by weight relative to the total weight.

The process product is then wound up on a stock reel 16 which is constructed to be rotatable and is drivable and actually driven. The circumferential speed of the driven stock reel 16 and its direction of rotation are so chosen that the tubing 2 when wound up on the reel, is transported, in the manner described, at the stated speed.

It is characteristic of the invention that, because of the relatively low water content of the aqueous polymer dispersion which comes into contact with the outer face of the cellulose hydrate tubing, the wall of the tubing, during the process, only takes up an amount of water less than that which corresponds to the swelling value (water retention capacity) of the tubing, so that virtually no shrinkage of the tubing occurs during the process. Preferably, the amount of water taken up during the coating operation is equal or less than 30%, especially 20 to 30% of the water-retention capability of the tubing. It is surprising that, in spite of the relatively low proportion of water or relatively high proportion of polymer in the dispersion, satisfactory film formation is ensured during the process, and that a crumbly coating of dispersed polymer does not form on the outside of the tubing.

Because of the small amount of the water which has to be expelled from the liquid layer of aqueous polymer dispersion in order to form a polymer film on the outside of the tubing, the process according to the invention is advantageous in respect of energy consumption and, for the same reason, permits a substantial increase in coating speed.

Since, in carrying out the process according to the invention, the initial tubing shrinks, because of the relatively low water content in the tubing wall, to only a virtually insignificant degree in the course of the manufacturing process, it is not necessary—in contrast to known processes—to counteract the shrinkage tendency by inflating the tubing.

Coating flaws which result on radial extension of the tubing and on free run-off, given a correspondingly high internal pressure in the tubing to prevent shrinkage of the latter, and which are attributable to differences in tubing wall thickness resulting from the production process, are avoided when carrying out the process according to the invention.

The water content of the thin layer of aqueous polymer dispersion on the outside of the tubing issuing from the metering nip of the pair of metering rolls is sufficiently low that the dispersion cannot run off freely. Accordingly, the outer coating is formed on the tubing without run-off defects in respect of the thin layer and with virtually no shrinkage in respect of the carrier tubing.

To summarize the exemplary embodiment set forth in the drawing, 1 denotes a rotatably constructed stock reel on which is wound the process starting material 2 in the form of cellulose hydrate tubing, defined in the description, carrying an adhesion-promoting layer of chemical material on its outside; 3 is a trough in which a rotatably constructed guide roller 4 is provided near the bottom of the trough. Reference numeral 5 denotes the aqueous plastic dispersion in the trough, 6 is a horizontal pair of metering rolls, 7 are the rotatably and drivably constructed rolls of this pair, 8 is the metering nip of the pair of rolls, delimited by the circumferential surfaces of the rolls 7, 9 is a pair of leveling rolls comprising the rolls 10a and 10b, 11 is a drying tunnel having an entry 12 and exit 13, and 14 is a moistening tunnel supplied with hot steam. Reference numeral 15 is a rotatably constructed, coolable and actually cooled roll, 16 is a rotatably constructed and drivable drum for winding up and causing the transportation of the process product, 17 is the piece of tubing before entering the trough filled with coating liquid, 18 is the tubing whose direction has been changed to vertically upward by the guide roller, 19 is the initial layer of aqueous polymer dispersion formed by entrainment of coating liquid on the outside of the tubing, 20 is the polymer dispersion of the initial layer which is held back by the rolls of the metering roll pair, 21 is the layflat tubing issuing from the metering nip of the pair of rolls and carrying a thin layer of aqueous polymer dispersion 22, 23 is the leveled, thin layer and 24 is the tubing after cooling. 25 is the plastic film coating, which is no longer tacky.

While the invention has been particularly shown and described with reference to preferred embodiments thereof, it is understood by those skilled in the art that various changes in form and detail may be made therein without departing from the spirit and scope of the invention as defined by the appended claims.

What is claimed is:

1. A process for coating the outside surface of a length of tubing essentially consisting of cellulose hydrate suitable for use as a sausage casing comprising the steps of:
   coating the outside surface of the tubing with an initial layer of coating liquid;
   transporting the coated tubing issuing from said coating step along its longitudinal axis in a substantially vertically upward direction;
   passing the coated tubing through a constriction of predetermined width to reduce the thickness of the initial layer and form a thin layer of desired thickness on the outside of the tubing;
   levelling the thin layer without reducing the weight per unit area of the thin layer to form a layer of uniform thickness; and
   exposing the tubing to heat of sufficient temperature to solidify the coating liquid and form an uninterrupted film of uniform thickness on the outside of the tubing, wherein the tubing is in a layflat state during all the process steps and wherein said coating step comprises moistening the tubing with the coating liquid, the tubing having a water-retention capacity in the range of about 120 to 140%, resulting in a water content, before the heating step, in the range of about 20 to 30% of the water retention capacity, wherein the coating liquid comprises an aqueous polymeric dispersion having a content of dispersed polymer of at least about 20% by weight relative to the total weight of the dispersion.

2. A process as recited in claim 1, further comprising the step of cooling the tubing after exposure to heat.

3. A process as recited in claim 1, further comprising the step of moistening the tubing after exposure to heat.

4. A process as recited in claim 1, wherein the step of leveling comprises bringing the thin layer continuously into contact with the circumferential surfaces of a pair of leveling rolls positioned on either side of the tubing.

5. A process as recited in claim 1, wherein the step of leveling comprises exposing the thin layer to a stream of air.

6. A process as recited in claim 1, wherein the coating liquid comprises an aqueous polymeric dispersion having a content of dispersed polymer of at least about 20 to 40% by weight relative to the total weight of the dispersion.

7. A process as recited in claim 1, wherein the step of constricting the tubing comprises passing the tubing through a constriction of sufficient width to insure that the thin layer of coating liquid has a thickness corresponding to a weight per unit area in the range of about 6 to 20 g of polymer per $m^2$ of tubing surface.

8. A process as recited in claim 7, wherein the thickness of the layer on the outside of the tubing corresponds to a weight per unit area in the range of from about 8 to 12 g of polymer per $m^2$ of tubing surface.

* * * * *